US007092583B2

(12) United States Patent
Ahlers et al.

(10) Patent No.: US 7,092,583 B2
(45) Date of Patent: Aug. 15, 2006

(54) APPARATUS AND METHOD FOR DETECTING THE AUTHENTICITY OF SECURED DOCUMENTS

(75) Inventors: Benedikt Ahlers, Berlin (DE); Anett Bailleu, Berlin (DE); Arnim Franz-Burgholz, Falkensee (DE); Oliver Muth, Berlin (DE); Manfred Paeschke, Basdorf (DE); Hans Zerbel, Berlin (DE)

(73) Assignee: Bundesdruckerei GmbH, Berlin (DE)

( * ) Notice: Subject to any disclaimer, the term of this patent is extended or adjusted under 35 U.S.C. 154(b) by 599 days.

(21) Appl. No.: 10/099,472

(22) Filed: Mar. 15, 2002

(65) Prior Publication Data

US 2002/0131618 A1 Sep. 19, 2002

(30) Foreign Application Priority Data

Mar. 16, 2001 (DE) ................................ 101 13 268

(51) Int. Cl.
*G06K 9/36* (2006.01)

(52) U.S. Cl. ......................... 382/280; 382/274; 283/72

(58) Field of Classification Search ........ 382/101–103, 382/108, 143, 112–116, 156, 162, 169–172, 382/175–180, 182–189, 194, 207, 210, 231, 382/237, 260, 274, 277, 286, 294, 317–321, 382/305; 235/468; 283/72; 356/71; 713/170, 713/179; 380/251; 503/227; 705/401; 428/199
See application file for complete search history.

(56) References Cited

U.S. PATENT DOCUMENTS

| | | | | | |
|---|---|---|---|---|---|
| 4,452,843 | A | * | 6/1984 | Kaule et al. | 428/199 |
| 5,280,333 | A | * | 1/1994 | Wunderer | 356/71 |
| 5,917,925 | A | * | 6/1999 | Moore | 382/101 |
| 5,974,150 | A | * | 10/1999 | Kaish et al. | 713/179 |
| 6,091,563 | A | | 7/2000 | Thomas, III et al. | |
| 6,136,752 | A | * | 10/2000 | Paz-Pujalt et al. | 503/227 |
| 6,155,604 | A | | 12/2000 | Greene et al. | |
| 6,155,605 | A | * | 12/2000 | Bratchley et al. | 283/72 |
| 6,264,107 | B1 | * | 7/2001 | Thomas et al. | 235/468 |
| 6,304,660 | B1 | * | 10/2001 | Ehrhart et al. | 380/251 |
| 6,571,334 | B1 | * | 5/2003 | Feldbau et al. | 713/170 |

FOREIGN PATENT DOCUMENTS

| | | |
|---|---|---|
| EP | 1 018 090 B1 | 4/2002 |
| FR | 2 593 840 A | 8/1987 |
| GB | 2 095 822 A | 10/1982 |
| WO | WO-96/24996 A1 | 8/1996 |
| WO | WO 99/16009 | 4/1999 |
| WO | WO 00/19428 | 4/2000 |
| WO | WO 00/19430 | 4/2000 |

OTHER PUBLICATIONS

European Search Report for EP 02 00 5012 dated Apr. 28, 2004.

* cited by examiner

*Primary Examiner*—Jingge Wu
*Assistant Examiner*—Seyed Azarian
(74) *Attorney, Agent, or Firm*—Darby & Darby

(57) ABSTRACT

A method and apparatus are disclosed for determining the authenticity of secured documents which include an authentication element of the type which, when excited with radiation of a specific excitation wavelength, emits radiation which can be detected by a detection unit and evaluated by an evaluating unit. The intensity profile of the emitted radiation is determined in a specified wavelength range over a predetermined measuring period after excitation and analyzed to determine authenticity of the secured document.

31 Claims, 5 Drawing Sheets

APPARATUS AND METHOD FOR DETECTING THE AUTHENTICITY OF SECURED DOCUMENTS

This invention relates to a method and apparatus for detecting the authenticity of secured documents.

BACKGROUND OF THE INVENTION

There are innumerable different types of documents and things which are subject to counterfeiting or forgery, and many different techniques and devices have been developed for determining the authenticity of a document or a thing. By way of example only, documents which are particularly in need of authentication include bank notes, identification papers, passports, packagings, labels and stickers, driver's licenses, admission tickets and other tickets, tax stamps, pawn stamps, and stock certificates. As used herein, the term "secured document" includes any document or thing which is provided with a distinguishing device (whether printed or not) which can be used to authenticate, identify or classify the document.

Furthermore, in addition to determining the authenticity of a secured document, it is sometimes useful to also determine the nominal value of the document or the nature of the document. For example, in a postal system, it is not only necessary to establish the authenticity of the postal stamps and/or release stamps, it may also be beneficial to determine the value of the postage stamps as they are passed through a postal sorting machine.

Accordingly, as used herein, the term "authentication element" is intended to refer to any "device" which may be printed on, or otherwise attached to, a secured document for the purpose of authenticating the document or for the purpose of determining its value and/or type or any other characteristic. Likewise "authenticity" is meant to encompass value, type or other characteristic of a secured document, as well as the genuineness of a document or thing.

It is known to provide secured documents such as bank notes with an authentication element in the form of a distinctive luminescent ink which, when excited by a light of a predetermined wavelength, will emit a distinctive low intensity radiation that can be detected and analyzed as a means for authenticating a secured document. German Patent No. DE 411 7911 A1 discloses such a system which includes a conically expanding fiber optical waveguide and an optical processing system. The radiation from the object to be tested can be collected over a large spatial angle with the narrow cross-sectional end of the fiber optical waveguide. Because of the cross sectional transformation, the radiation emerges from the fiber at a significantly smaller angle, which is coordinated with the cone angle of the optical processing system.

With such a system it is possible to detect relatively low intensity distinguishing luminescent authenticity elements. However, the magnitude of the distinguishing luminescent elements must exceed a certain threshold. The system is therefore still relatively insensitive. Because of the use of a conical fiber, there is also the disadvantage that only a small region of the document can be monitored and checked. Moreover, the system may fail if the authenticity element is disposed at certain places in the document. Further, documents such as postage stamps cannot be identified with this arrangement at the high speeds customary in sorting, distributing and/or counting machines. In the case of laser excitation, characteristic pulse responses, which are of decisive importance for identifying authenticity, also may not be recognized and evaluated.

It is a principal object of this invention to provide an improved method and apparatus for determining the authenticity of a secured document.

Another object of the invention is to provide an improved method and apparatus for determining the authenticity of secured documents while they are moving at high speeds.

A more specific object of the invention is to provide an improved method and apparatus for determining the authenticity of secured documents which contain an authentication element of the type which emits radiation when excited by radiation of a predetermined excitation wavelength, and which include none of the above-mentioned drawbacks.

A still further object of the invention is to provide an improved method and apparatus for distinguishing between different types of secured documents.

SUMMARY OF THE INVENTION

The invention is intended to be used with secured documents containing an authentication element which, when excited with radiation of a predetermined excitation wavelength, emits radiation. According to the invention, the intensity profile of the emitted radiation is determined in a specified wavelength range over a predetermined measuring time interval after excitation. The intensity profile is then analyzed in a number of different ways to determine the authenticity of the secured document.

In one embodiment, the intensity profile is analyzed by determining the length of the time period during which the intensity of the emitted radiation is equal to or greater than a specified threshold value. The secured document is regarded as "authentic" when the determined time period is greater than or equal to a specified nominal value.

In another embodiment, the intensity profile is compared with one or more intensity profile patterns stored in a database. In this case, a secured document is regarded as authentic when the difference between the determined intensity profile and at least one of the stored intensity profile patterns is less than or equal to a specified summation threshold value.

In a third embodiment of the invention, the rise time of the intensity over a specified period of time is measured and compared with at least one nominal rise time. If the difference between the measured rise time and at least one of the nominal rise time values is less than or equal to a predetermined value, the secured document is regarded as authentic.

THE DRAWINGS

Figure 3:
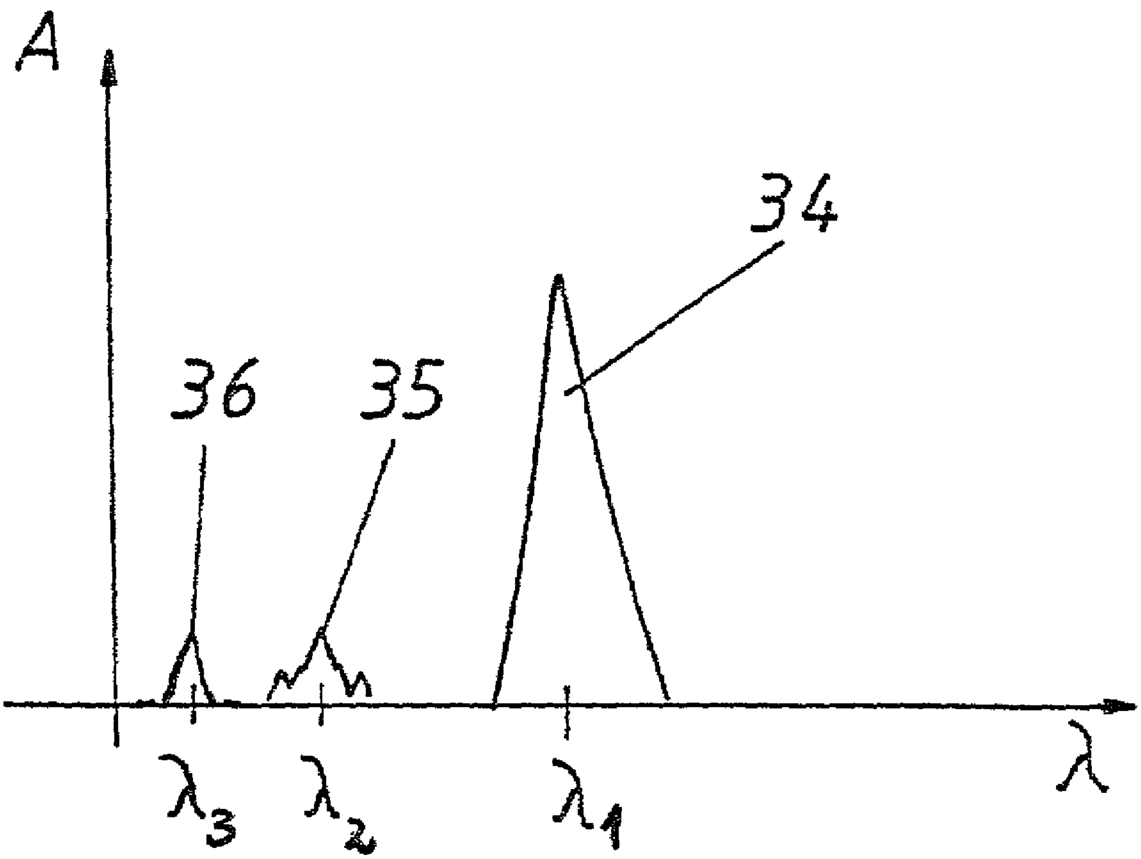
Figure 4:
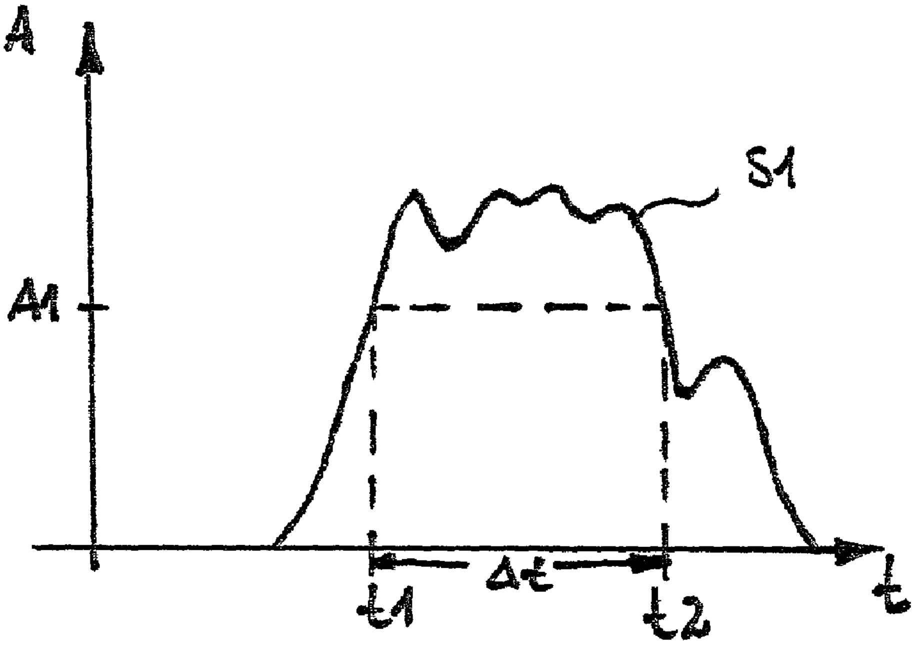
Figure 5:
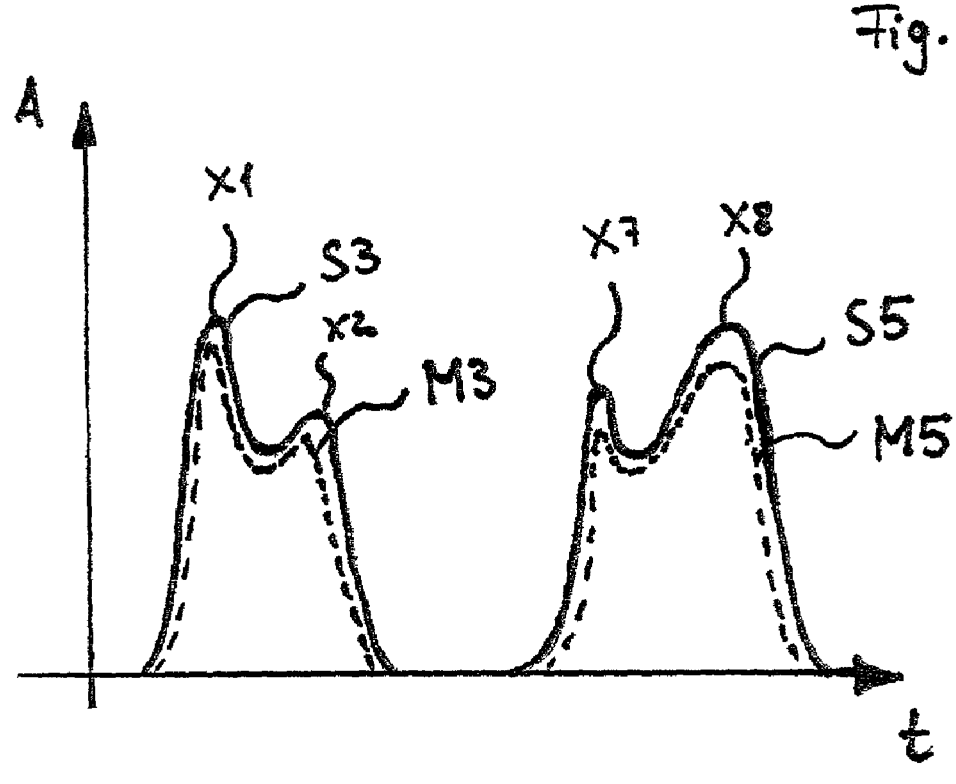
Figure 6:
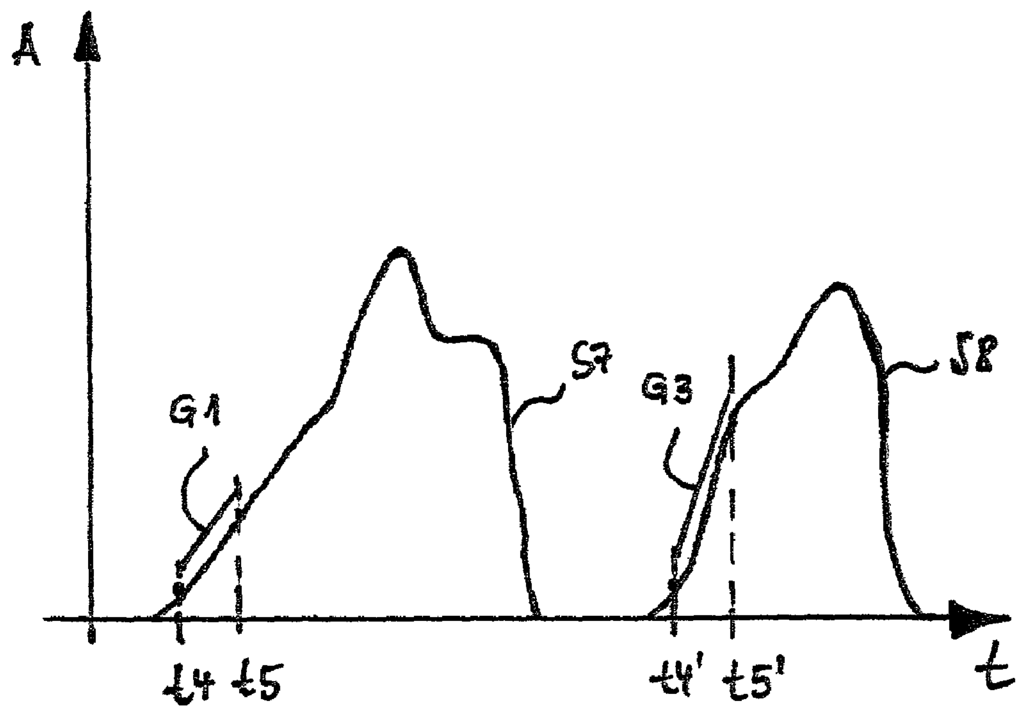
Figure 7:
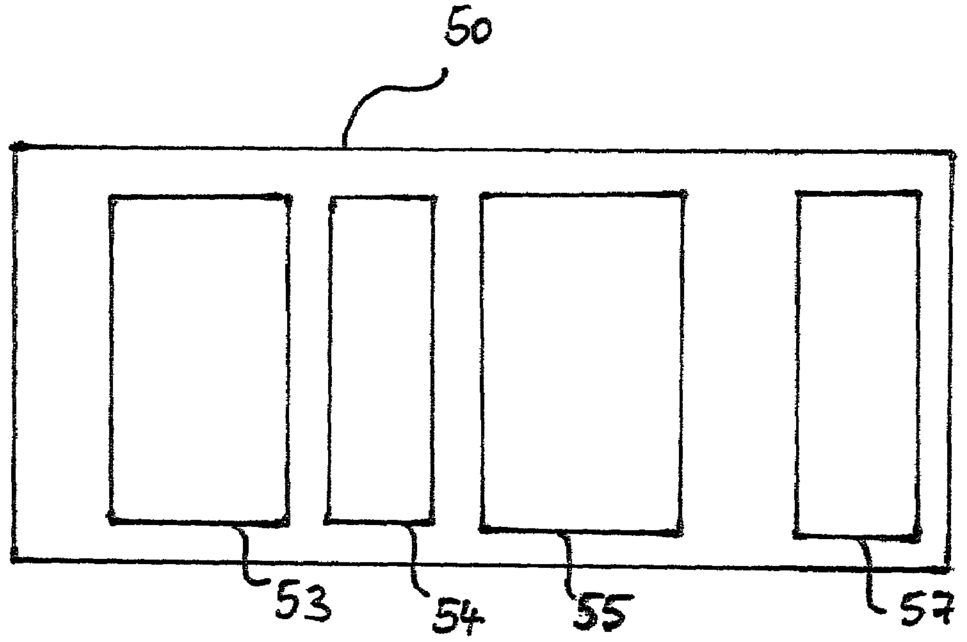

FIG. 3 diagrammatically shows an emission response of the fluorescent material in the spectral diagram;

FIGS. 4, 5 and 6 are diagrammatic representations of the time dependence of the signals recorded; and FIG. 7 is a diagrammatic representation of a further example of the sensor.

DETAILED DESCRIPTION

The sensor in accordance with the invention is suitable for installation in a high speed transporting device and can also be constructed as a scanner. It is capable of detecting a distinguishing authenticity element, predominantly on flat objects. In the preferred embodiment, the authenticity element comprises a printing ink with which up-conversion pigments (also known as anti-Stokes fluorescent materials) are mixed. If need be, these pigments can be mixed directly with an applied solution, an applied lacquer, an adhesive or a carrier, such as paper. Advantageously, pigments with a rapid rise time and a rapid decay time (such as 0.01–1 ms) are used in order to permit detection at the high speeds desired. Of course, the electronic evaluation is adapted to the characteristic times of the pigments.

The distinguishing authenticity element is preferably an anti-Stokes fluorescent material (also known as an anti-Stokes pigment, anti-Stokes phosphor, or up-conversion material), which is a gandolinium oxysulfide activated with thulium and co-doped with ytterbium, having the composition $$(Gd_{1-x-y}Yb_xTm_y)_2O_2S$$

or also (different notation)

$$(Gd_{1-x-y})_2O_2S{:}Yb_xTm_y$$

Examples of chemical compositions for the authentication element of the present invention can be found in U.S. application Ser. Nos. 10/101524 and 10/101520, filed Mar. 15, 2002, which are incorporated herein by reference.

Yttrium and/or lanthanum can also be used proportionately as the basic lattice (host lattice material, matrix material) instead of gadolinium. The fluorescent material is able to convert comparatively low energy infrared (IR) excitation radiation into higher energy radiation (up-conversion or anti-Stokes effect).

A high level of security is obtained by analyzing the time dependence of the intensity signal at a particular wavelength. The time dependence of the signal is highly dependent on the rise time and decay time behavior, especially on the rise time behavior, of the emitted signal. This signal, in turn, can easily be varied, for example, by doping the fluorescent material with Yb and Tm. The invention offers a forgery-proof capability of identifying the nominal value of the secured document or the nature of the document.

Alternatively, other pigments can also be used, in which case the build-up and decay behaviors, especially the build-up behavior of the emitted radiation of the pigment must permit a rapid detection of the emitted radiation. For example, photoluminophores, cathodoluminophores or electroluminophores may be used.

The build-up and decay characteristics of the anti-Stokes fluorescent material and, in particular, the matching of the excitation and evaluation unit to the build-up and decay characteristics of the corresponding fluorescent material largely determine the attainable detection reliability and the possible reading speed of the distinguishing luminescence feature. Moreover, the build-up can be characterized, for example, by the time required to reach 90% (t90) of the saturation intensity or by the so-called build-up constant (the time required to reach 1/eth of the steady state luminescence intensity).

For a given high reading speed, the build-up time of the anti-Stokes luminescence may not exceed a specific value if an effective luminescence intensity is to be assured above the sensitivity threshold of the detector. This effective value of the intensity is determined by the relationship between the steady state intensity and the build-up time.

Moreover, because of their particular build-up and decay behavior, the signals emitted by the fluorescent material show a characteristic intensity profile as a function of time. The realization that anti-Stokes intensities and other luminescence intensities can be used not only in relation to their spectral distribution, but also in relation to their temporal dependence for the analytical verification of authenticity (which includes identifying value or other characteristic) is a feature of this invention.

In the case of the $(Gd_{1-x-y}Yb_xTm_y)_2O_2S$ fluorescent material, the relationships between the saturation intensity and the build-up and decay times can be varied. In particular, it is possible to assure the low build-up times required for high-speed detection. For this purpose, the ytterbium and/or thulium concentrations are varied within certain limits. The selective incorporation of defects in the lattice of cations or anions of the luminescent material represents a further possibility for influencing the build-up and decay characteristics.

The distinguishing authentication element may be of small dimensions (for example, 5 mm×5 mm). When the authentication element is applied by a printing method, the imprint can be applied within relatively wide limits. The required measuring range of the sensor should therefore include the entire region of the possible printed field, although the imprinted distinguishing authenticity element may appear anywhere in the printed region and the printed region may be several times larger than the authenticity element. The measuring region (scanning region, transverse to the transporting direction) may, for example, be up to 70 mm in size.

Preferably, the detection is locally resolved in the transporting direction. The speed in the transporting direction may vary from 0 to 12 m/s.

When a synchronization input is used, to which a switching signal proportional to the speed is supplied, a certain, specified, partial section of the test object alone can also be investigated, even if the speed varies.

For the sake of simplicity, it is assumed in the following description that a laser is used as the source of the light beam although other light sources such as LED's may be used. The use of a laser has the advantage that the scanning line is imaged with a relatively high radiation intensity on the surface of the document. This does not happen to the same extent when other light sources are used. The brightness is correspondingly lower when other beam sources, such as LEDs, are used.

A laser wavelength, for example, above 900 nm may be used. Other laser wavelengths are also possible. In addition, the spectral width of the laser line may vary. Several relatively close parallel beams may be used in order to recognize the small, labeled, distinguishing authenticity element. Moreover, it is possible to use a broadband source of electromagnetic radiation.

The laser line may be produced with normal cylindrical lenses and produces an illumination density which is greatest in the center of the line. The laser line preferably is produced with an aspherical cylindrical lens or, alternatively, with an array of cylindrical lenses or with a sinusoidal lens surface. The radiation intensity is either distributed uniformly over the whole length of the laser line or is slightly greater at the edge (or in the center) in order to compensate for sensitivity variations of the detector over the measuring range.

The focusing in the plane of the object is such that, if need be, when used without a laser line, there is a slight defocusing, in order to achieve an optimum radiation intensity for the pigments. The luminescence efficiency varies with the intensity of the radiation and generally has an optimum at a radiation intensity which is high, but not too high. If the radiation intensity is too high, the signal strength of the light received drops.

Advantageously, a strongly diverging laser beam is used, in order to be able to use less expensive lasers for the production of the sensor.

The undesired wavelengths of the light source in the spectral detection region are filtered out optically. A suppression to $<10^{-7}$ is preferred. The distinguishing authentication element must be recognized during at least two periods; otherwise, it is discarded as unsatisfactory.

Figure 1:
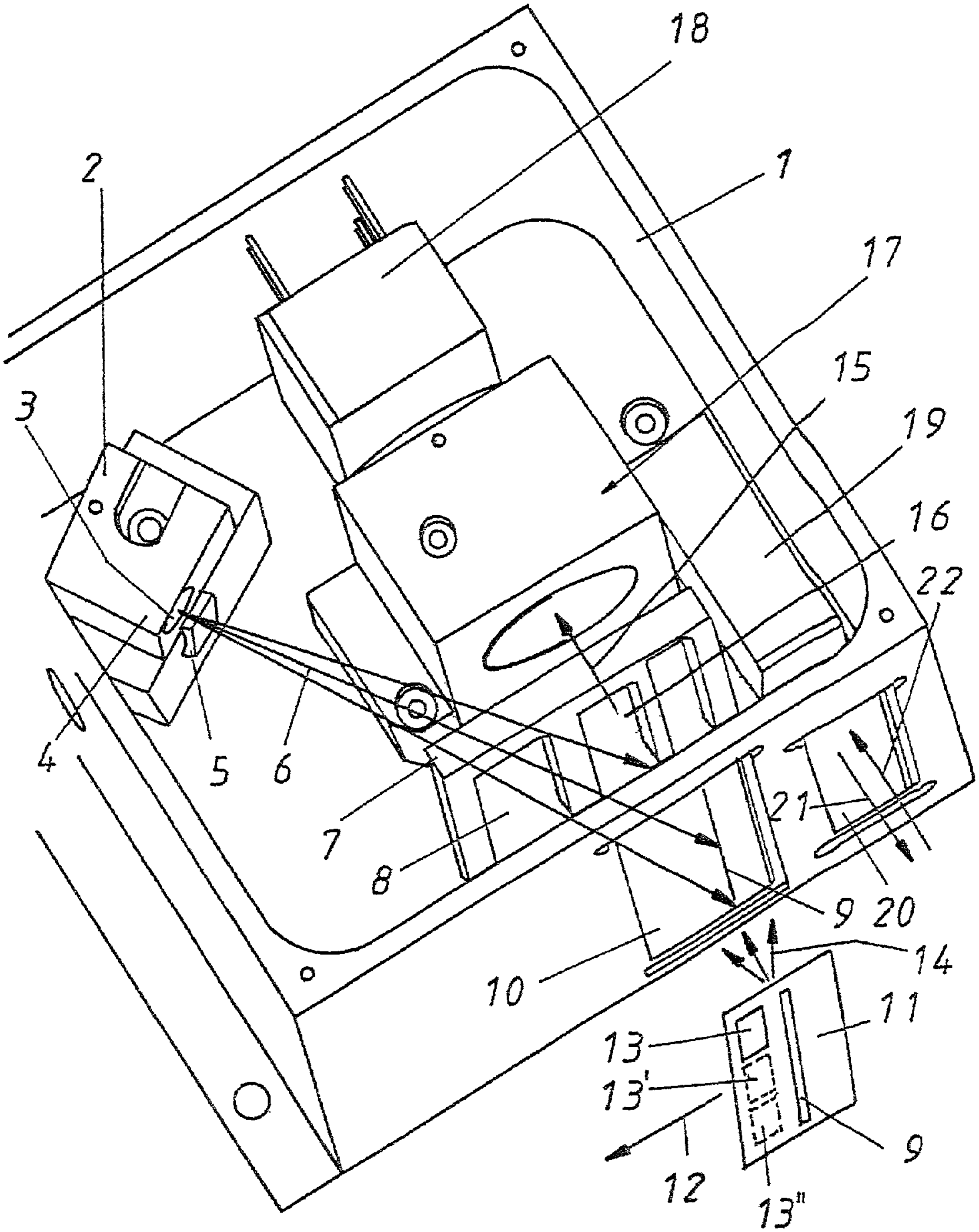
FIG. 1 is a diagrammatic top view of the inventive sensor.

In FIG. 1, a laser 2 is arranged in a housing 1. A focusing lens 4 is disposed in a manner, the details of which are not shown, in the interior of the housing (see also FIG. 2). A cylindrical lens 5, which expands the beam 6, is disposed in front of the beam opening 3 so that the beam 6 is radiated in the direction of the arrow shown onto the measuring window 10 to form an approximately line-shaped scanning line 9. The beam 6 passes through a window 8 in a diaphragm 7 which has several windows.

The measuring window 10 is closed by a glass pane. The secured document 11 which is to be authenticated passes in the direction of arrow 12 as close as possible to the measuring window, practically in contact with the glass pane. A distinguishing authenticity element 13 is disposed in a predetermined region on the secured document. The authenticity element 13 maybe placed at different sites, for example, also at sites 13' or 13". The length of the scanning line 9 advantageously is selected so that, at most, it corresponds to the width of the secured document so that the scanning line 9 always encounters an authenticity element 13, even when the latter is disposed at an unexpected site on the secured document 11.

The authenticity element 13 functions as described above and, after excitation by the laser light, radiates an emitted beam 14 along the scanning line 9 back through the measuring window 10 and through the window 16 in the direction of arrow 15.

This beam is then processed further in an optical head 17 and finally supplied to an evaluating unit 18. This evaluating unit preferably consists of a photomultiplier (secondary electron multiplier). Instead of a photomultiplier, other evaluating units can also be used, such as photodiodes or a matrix camera, which works with a CCD chip or a CMOS chip.

In order to achieve synchronous amplification, the evaluation is conducted over an analog circuit with sample and hold elements. Synchronous amplification enables evaluation of light signals which are received in phase with the repetition frequency of the emitted laser light. The signal evaluation may also involve further functions such as sampling of a signal at a leading edge at a first time after the start of the pulse and comparing this signal with the signal at a second time after the start of the pulse. For this purpose, the selected time windows must be adapted to the bandpass frequency of the electronics and, in particular, to the build-up and decay times of the pigment. These signals and time signals are controlled advantageously by a microprocessor. The same principle can be employed in the pulse pause and the decay behavior of the signal can be investigated.

Alternatively, the evaluation can be carried out using a microprocessor with an integrated or external A/D converter.

For greater clarity, the document 11 in FIG. 1 is shown spaced from the measuring window 10. This is not actually the case since document 11 should be moved past the measuring window 10 as close as possible to it, if not even in contact with it, in the direction of arrow 12.

Optionally, a document sensor 19, which preferably is constructed like a light barrier, is included in the housing 1 to determine whether a document to be authenticated is present. A measuring beam 21 is projected onto the secured document to be authenticated and reflected from the document in the direction of arrow 22 through the window 20. In a further example, the excitation by the measuring beam 21 can also cause an emission of radiation in the direction of arrow 22, which then passes through the measuring window. After sensing the presence of a document, the optical system of the laser is cleared and then the scanning line 9 is generated on the surface 11 of the secured document which is to be authenticated. In this case, the distinguishing authenticity element is evaluated only during the time in which the document sensor 19 has noted the presence of a document.

Figure 2:
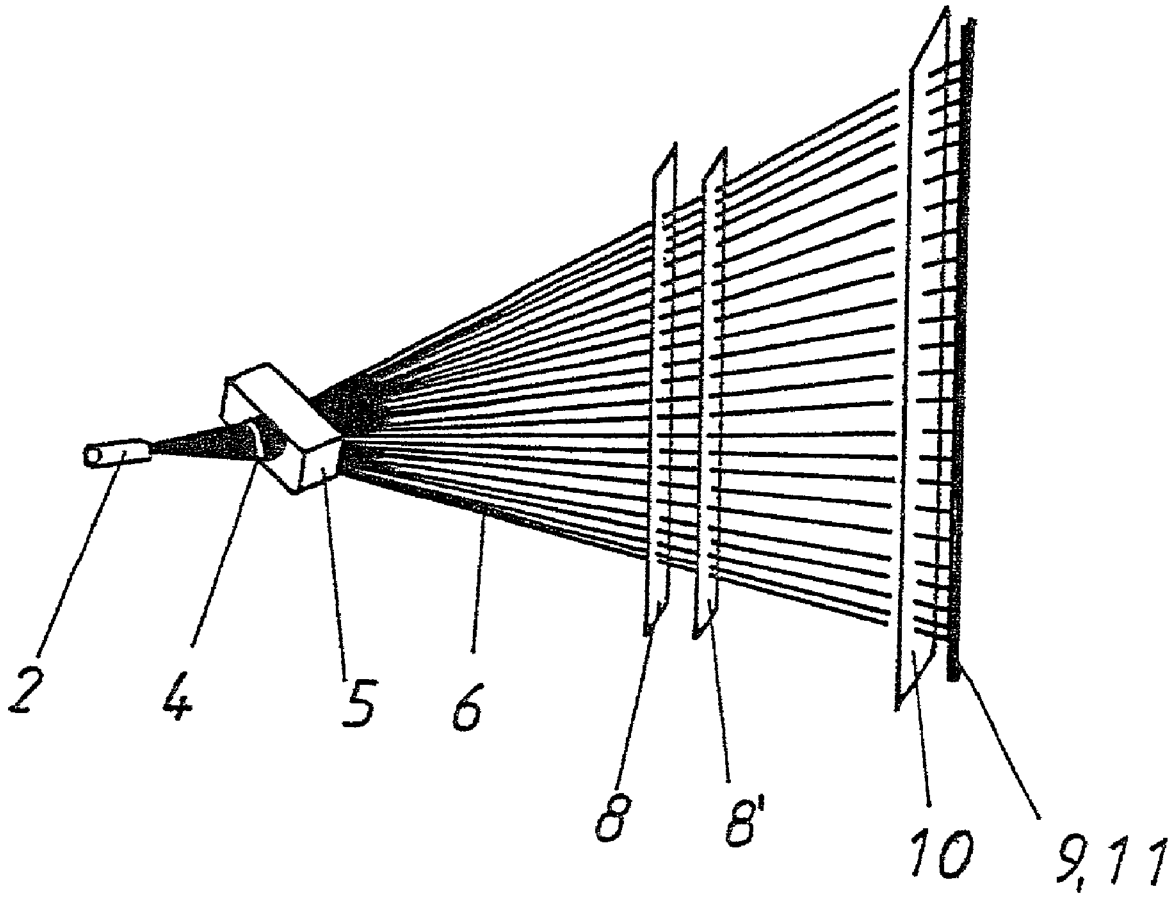
FIG. 2 is a diagrammatic representation of the radiation bundle, emitted by the radiation source.

In FIG. 2 the configuration of the beam 6 produced by the laser 2 is shown in greater detail. The beam initially passes from the laser through a focusing lens 4 and then is expanded linearly by a downstream cylindrical lens 5 and bounded by one or more consecutive diaphragms 8, 8' in such a manner that in the region of the measuring window 10, it produces the linear scanning line 9 on the document 11.

If a laser 2 is used, the scanning line, for example, may be about 0.1 to 0.3 mm wide and 70 mm long. The wavelength of the laser may, for example, be in the infrared, visible or ultraviolet wavelength range.

The optical head 17 contains at least one filter (not shown) and limits the wavelength region evaluated by the evaluating unit 18. For example, at least one filter is provided which selects the wavelength which is to be transmitted. Such wavelengths may be in the infrared, as well as in the visible or ultraviolet wavelength range and are independent of the radiation emitted by the distinguishing authenticity element 13. In a further example, an additional filter may be provided to prevent the visible light from reaching the evaluating unit. In a further example, mirrors and/or lattices may be provided in the optical head 17 in addition to and/or instead of the filters. The mirrors and/or lattices, which maybe located in the beam path, select a particular wavelength range.

To compensate for different heights of the secured documents, the optical head 17 may contain a hollow mirror (not shown) which bundles the radiation emitted by the distinguishing authenticity element 13, and realizes this bundling independently of the height of the document, which is to be examined.

Moreover, the optical head 17 may contain a reflecting cone (not shown) on which the entire ray bundle is bundled. This reflecting cone is a metal-coated hollow body which is constructed in the form of a funnel and has internally reflecting surfaces. This ensures not only that the beams which are imaged directly on the receiving element pass through the reflection cone, but also that those beams which strike the internal surface of the reflection cone are reflected and combined with the main beam. The reflecting cone thus amplifies the light beam received significantly, because not only the direct beams, but also the lateral beams which strike the interior walls of the reflection cone at an angle, are used for the evaluation.

As mentioned above, different elements can be used for the evaluating element 18; a photomultiplier is the starting point for the following description. The photomultiplier may include an 8 mm active zone disposed directly in contact with the outlet surface of the reflecting cone, the dimensions corresponding approximately to the dimensions of the outlet surface.

FIG. 3 shows a possible spectral distribution of the signal emitted by the distinguishing security feature 13. The intensity A is plotted on the ordinate of the coordinate system and the wavelength λ is plotted on the abscissa. It is assumed that the laser excitation 34 takes place at a particular wavelength $\lambda_1$ and that the distinguishing authenticity feature 13 responds with a corresponding up-conversion luminescence 35 with a lower wavelength $\lambda_2$. This up-conversion luminescence 35 is detected and evaluated by the evaluating unit 18.

In addition to a single up-conversion luminescence in the wavelength region $\lambda_2$, it is possible that a further up-conversion luminescence 36 will arise, for example, in the wavelength region $\lambda_3$ at 36. Such luminescence can also optionally be detected by the evaluating unit 18.

The optical head 17 may be configured in such a manner that the filters and/or mirrors and/or lattices, described above, only transmit the signals of a particular wavelength range with a width, for example, of 100 nm and preferably with a width of 10 nm. The evaluating unit 18 detects the intensity of the signal over a certain measuring period. Such a measuring period could, for example, be the time, which passes until the document sensor 19 detects a new security documents. Accordingly, the measuring period may be variable. In a different example, the time period can be set at a constant value and correspond to the time in which a secured document is in a position to emit radiation. This time depends on the relative speed at which the secured document moves past the sensor in the direction of arrow 12.

A signal S1 detected by the evaluating unit 18 is shown diagrammatically in FIG. 4. The time t is plotted on the abscissa and the intensity A is plotted on the ordinate. The S1 signal increases for a certain time then passes through several local maxima and minima and decreases once again.

In a next step, the detected signal S1 may be examined for the time period during which it exceeds a certain, specified intensity threshold A1. For this purpose, the signal may be divided, for example, into small time units. The evaluating unit 18 then determines the sum of the time units during which the intensity is above or at the intensity threshold A1. In the example of FIG. 4, the length of time, during which the intensity threshold A1 is exceeded is labeled Δt and extends between the first time t1 and the second time t2. The time period Δt subsequently is compared by the evaluating unit with a specified nominal value t(soll). If the time period Δt ascertained is longer than or equal to the nominal time period t(soll), the security document is verified as authentic. In a further example, the measured time period Δt is compared with different threshold values t(soll1), t(soll2), etc. If the magnitude of the difference between the ascertained time period Δt and one of the nominal values t(soll1), t(soll2) is smaller than or equal to a specified difference value, the document is verified as authentic and can be assigned to a particular type or to a particular nominal value. For example, it is possible to differentiate in this manner between bank notes of different countries or postage stamps of different value. The threshold values t(soll1), t(soll2), etc. are stored in a database or in a database which is connected with the evaluating unit 18, each nominal value being assigned to a particular kind of bank note or to a particular postage stamp value.

The results of the analysis can be displayed on a display unit (not shown) connected to the evaluating unit 18. For example, a red lamp can light up if a document is recognized as not authentic. In a different example, the value recognized (for example, that of a postage stamp) can be indicated on an LCD display.

In a further example, the measured time-dependent intensity profile may be compared with an intensity profile pattern stored in a database. This example is explained by means of the diagram in FIG. 5. As in FIG. 4, the intensity A of the measured signal of a particular, specified wavelength range is plotted in this diagram as a function of the time t. Two consecutively measured signals S3 and S5 are shown diagrammatically in FIG. 5. The first signal S3 comes from a first secured document and the second signal S5 comes from a second secured document. The profiles of both signals have rising flanks at the start and dropping off flanks at the end. In between, the first signal S3 is characterized by a first maximum X1 and a second maximum X2 and by an intensity minimum lying between these maxima. The second signal S5 has a first maximum X7 and a second maximum X8 between the rising and dropping-off flanks and a minimum between these maxima. The two signals differ in that the maxima and the minima differ on the time scale in intensity as well as in position. The evaluating unit now compares the intensity profile patterns stored in the database with the measured intensity profiles S3 and S5 over a certain period of time. For this purpose, the signals, for example, may be discriminated and compared with correspondingly discriminated entries in the database. The S3 signal shows the smallest deviation from the intensity profile of the M3 pattern and the S5 signal the smallest deviation from the intensity profile of the M5 pattern. If the deviation (that is, the magnitude of the difference between the signal and the intensity profile pattern with the least deviation) is less than or equal to a fixed, specified summation threshold value, the evaluating unit 18 recognizes that the secured document with the signal S3 is authentic and corresponds to a certain nominal value which has been assigned to the M3 pattern. The secured document with the S5 signal is authentic and corresponds to a certain nominal value which has been assigned to the M5 pattern. If the deviation exceeds the predetermined summation threshold value, the corresponding secured document is recognized as a forgery or counterfeit. The result of the analysis of the signal can also be displayed on a display unit.

A further example of the invention is described with reference to the signals S7 and S8 shown in FIG. 6. In this connection, the representation of the signal corresponds to that selected in FIGS. 4 and 5. The two signals shown, which originate from different secured documents measured consecutively are distinguished primarily because the slopes of the emitted signals differ. This may be utilized by the evaluating procedure in the following way. The average slope (first derivative) of the signal is calculated by the evaluating unit between two, fixed, specified times t4 and t5 or t4' and t5'. In FIG. 6, the slopes are drawn above the respective signal curve and labeled G1 for signal S7 and G3 for signal S8. The slopes G1 and G3 are compared with nominal ascent (rise time) values G(soll1), G(soll2), etc., stored in a database. If the deviation from a particular nominal ascent value is less than a certain, specified threshold ascent value, it is recognized that the corresponding secured document is authentic. It can also be assigned to a particular type or a particular nominal value in this manner. If the measured slope does not correspond to a nominal slope from the database within appropriate limits, then the corresponding document is recognized as a counterfeit or forgery. Again, the results of the analysis can be shown on a display unit.

The example, explained above, can also be used at the signal flanks at the end of the signal or in the center of the signal. The term "slope" in the claims should be construed to cover all regions of the intensity profile.

The corresponding deviations (difference value; summation threshold value and ascent threshold value) can also be provided in the database in such a manner that they are assigned to the nominal value or to the intensity profile pattern or to the nominal ascent value, which has the smallest deviation from the value respectively determined. The corresponding difference is then compared with the corresponding specific difference value or summation threshold value or ascent threshold value.

The basis of all of the methods presented here for identifying the authenticity of distinguishing authenticity elements on secured documents is the realization that the rise time and/or decay times, (especially the rise time) of the detected radiation is a significant characteristic of the authenticity element. This characteristic is counterfeiting-proof and forgery-proof, since the rise and decay times of fluorescent materials which emit radiation can only be varied by changing the doping or by incorporating defects in the crystalline lattice. These characteristics can only be recognized and imitated with difficulty by a forger or counterfeiter.

In a further embodiment of the inventive sensor, the signals in a particular, specified larger wavelength range are determined in addition to the evaluation of the intensity of the signal in a particular wavelength range with a greatly limited magnitude. For this purpose, the optical head 17 is equipped with appropriate filters and/or mirrors and/or lattices. The electromagnetic radiation emitted by the secured document in a particular measuring time period is then determined by the evaluating unit 18 in the larger wavelength range as a function of the wavelength. In general, several emission lines are determined, as shown, for example, by means of lines 35 and 36 in FIG. 3. Subsequently, the evaluating unit determines the area under the respective emission lines as a measure of the intensity of the respective line. After that, the ratio of the intensities of two selected lines is formed and compared with a nominal intensity ratio, which is stored in the database. Correspondence with the nominal intensity ratio value can be an additional criterion for identifying "authenticity" since the intensity ratio is also varied when the build-up and decay times of the up-conversion luminescence are varied.

In a further example, the intensity at the maximum of the respective line can also be used as a measure of the intensity of an emission line.

In the following, an example of a sensor and method in accordance with a preferred embodiment of the invention is described. The example is advantageous in authenticating postage stamps, and is able to examine letters and other items which are provided with postage stamps or release stamps for the presence and the correct value of the release stamp or the postage stamp and, if the postage is correct, to release them for mail service, i.e., to postmark them.

The system is explained by means of the diagrammatic drawing of in FIG. 7. The sensor unit 50 contains a first sensor element 53, a second sensor element 54, a third sensor element 55 and a postmarking and release element 57, the postal item passing through the elements of the sensor unit 50 in the sequence given.

In the first sensor element 53, the postal item is analyzed to see whether it contains postage stamps or a release stamp and, if so, at which place on the postal item. In the sensor element 53, known methods are employed which are based on image recognition. This information obtained, i.e., whether postage stamps or release stamps are present and where they are positioned, is passed on to the sensor element 55. If neither postage stamps nor release stamps are contained on the postal item, the item is removed.

The postal item is then passed to the second sensor element 54. This sensor element checks the nature of the postal item, using image recognition methods and weight measurement. At the same time, different types of cards and letters are differentiated on the basis of their size and their weight; different types of packages are also differentiated on the basis of size and weight. The information gained by the second sensor element is also passed on to the third sensor element 55.

After the postal item has passed on to the third sensor element 55, the latter, similar to one of the examples described above, takes over the analysis of the verification elements of the postage stamp or release stamp. The structure of the third sensor element may be similar to that of the sensor element shown in FIG. 1. The postage stamp or release stamp is examined by the third sensor element 55 for authenticity and/or value. The use of a hollow mirror in the beam path of the radiation emitted is advantageous here since different heights of the postal items do not affect the focus of the emitted beam. This can be particularly advantageous since, because of the information available from the first sensor element, it is known where the postage stamp or release stamp is located and whether the value-imparting element on the postal item is a postage stamp or a release stamp. In a further step, in a preferred example, the value which is to be expected on the basis of the information from the second sensor element 54, can be compared with the value of the postage stamp and/or release stamp determined in the third sensor element 55. If the value determined is greater than or equal to the value to be expected on the basis of the nature of the postal item, the latter is released in the release and stamp unit 57 and provided, for example, with a cancelled postmark. If the value determined is less than the expected value, the postal item is removed and, for example, marked in order to initiate a postage-due action.

The example described above can also be carried out without determining and comparing the value. The value of the release stamp or the postage stamp can be investigated in a different way and compared with a nominal value, which depends on the nature of the postage item. In that case, the sensor unit 50, by means of the third sensor element 53, then only verifies the distinguishing authentication element on the postage stamp or release stamp. The second sensor element 54 is omitted in this case.

The authenticity element, in the form of pigments which, when excited by electromagnetic radiation of a particular wavelength, emit radiation of a different wavelength, can be introduced or applied in a known manner to the postage stamps. The release stamp contains the appropriate pigments in its ink.

We claim:

1. A method for determining the authenticity of secured documents which contain an authentication element that emits radiation when excited with radiation of a predetermined wavelength range, said emitted radiation having an intensity profile in which the intensity of the emitted radiation increases from a base level to at least a first maximum and decreases to the base level, including the steps of exciting said authentication element with radiation of said predetermined wavelength range, determining the intensity profile of the radiation emitted by said authentication element over a predetermined time interval, and verifying the authenticity of said secured document based on an analysis of said determined intensity profile at least during a period in which the intensity is increasing to said first maximum.

2. A method for determining the authenticity of secured documents according to claim 1, wherein said determined intensity profile is analyzed by measuring the time interval between a time when the intensity of the emitted radiation increases to a predetermined intensity threshold and a time when the intensity of the emitted radiation decreases to said intensity threshold, and verifying the secured document as authentic when the length of said time interval is greater than or equal to a specified nominal value.

3. A method for determining the authenticity of secured documents according to claim 2, wherein the length of said time interval is compared with at least two nominal values and, if the difference between the length of said time interval and at least one of said nominal values is less than or equal to a specified difference, storing data specific to the secured document and said at least one nominal value.

4. A method for determining the authenticity of secured documents according to claim 1, wherein the determined intensity profile is analyzed by comparing it with at least one intensity profile pattern which is stored in a database, determining the difference between the determined intensity profile and the at least one stored intensity profile pattern, and recognizing said secured document as authentic when the difference between the determined intensity profile and said at least one stored intensity profile pattern is less than or equal to a predetermined value.

5. A method for determining the authenticity of secured documents according to claim 4, wherein the determined intensity profile is further analyzed by comparing it with a plurality of stored intensity profile patterns, determining the stored intensity profile pattern which has the least deviation from the determined intensity profile, determining the difference between the determined intensity profile and the stored intensity profile with the least deviation, and, if such difference is less than or equal to a predetermined value, storing data specific to the secured document and the intensity profile pattern having the least deviation.

6. A method for determining the authenticity of secured documents according to claim 1, wherein said determined intensity profile is analyzed by measuring the slope of the intensity profile of the emitted radiation over said predetermined time interval during which the intensity of the emitted radiation is increasing from said base level to said first maximum, comparing the measured slope with at least one nominal slope value, and recognizing the secured document as authentic when the difference between said measured slope and said at least one nominal slope value is less than or equal to a specified value.

7. A method for determining the authenticity of secured documents according to claim 6, wherein the measured slope is compared with a plurality of stored nominal slope values, determining the stored nominal slope which deviates the least from the measured slope, determining the difference between the measured slope and the stored nominal slope value with the least deviation, and, if such deviation is less than or equal to a specific value, storing said data specific to the measured slope and the nominal slope with the least deviation.

8. A method for determining the authenticity of secured documents according to claim 3, wherein said specified difference is retrieved from a database and assigning said specified difference to the nominal value with the least deviation from the determined time interval.

9. A method for determining the authenticity of secured documents according to claim 5, wherein said predetermined value is retrieved from a database and assigning said predetermined value to the intensity profile pattern with the least deviation.

10. A method for determining the authenticity of secured documents according to claim 7, wherein said specific value is retrieved from a database and assigning said specific value to the nominal slope value with the least deviation.

11. A method for determining the authenticity of secured documents according to claim 1, wherein the intensity ratio of two anti-Stokes emission lines is used and compared with a nominal intensity ratio as an additional criterion for verifying authenticity.

12. A method for determining the authenticity of secured documents according to claim 1, wherein prior to exciting the authenticity element with radiation, at least one characteristic of said authenticity element is ascertained by means of image recognition.

13. A method for determining the authenticity of secured documents according to claim 12, wherein the security documents comprise postal documents and the authentication elements are contained on postage stamps and/or release stamps.

14. A method for determining the authenticity of secured documents according to claim 13, wherein the postage stamp or the release stamp is postmarked if the postal item has been identified as authentic.

15. A sensor for determining the authenticity of a secured document which contains at least one authentication element that emits radiation when excited with radiation at a predetermined wavelength range, said emitted radiation having an intensity profile in which the intensity of the emitted radiation increases from a base level to at least a first maximum and decreases to the base level, comprising:

means for exciting the authentication element with radiation of a predetermined excitation;

a detecting unit for detecting the radiation emitted by the authentication element; and an evaluating unit for evaluating the radiation emitted by the authentication element, said evaluating unit including means for determining the intensity profile of the emitted radiation in a predetermined wavelength range over a predetermined measuring period, and means for verifying the authenticity of said secured documents based on an analysis of said determined intensity profile at least during a time period in which the intensity is increasing to said first maximum.

16. A sensor for determining the authenticity of a secured document according to claim 15, wherein said analysis includes a measurement of the time interval between a time when the intensity of the emitted radiation increases to a predetermined intensity threshold and a time when the intensity of the emitted radiation decreases to said predetermined threshold, the secured document being verified as authentic when the length of said measurement of the time interval is greater than or equal to a specified nominal value.

17. A sensor for determining the authenticity of a secured document according to claim 16, wherein said means for verifying includes means for comparing the length of said measured time interval with at least two nominal values and, means for storing data specific to the secured document and said at least one nominal value if the difference between the length of said measured time interval and at least one of said nominal values is less than or equal to a specified difference.

18. A sensor for determining the authenticity of secured documents according to claim 15, wherein said means for verifying includes means for comparing the determined intensity profile with at least one intensity profile pattern which is stored in a database, and means for determining the difference between the determined intensity profile and the at least one stored intensity profile pattern, a secured document being verified as authentic when the difference between the determined intensity profile and said at least one stored intensity profile pattern is less than or equal to a predetermined value.

19. A sensor for determining the authenticity of secured documents according to claim 18, wherein said means for comparing compares the determined intensity profile with a plurality of stored intensity profile patterns, determines the stored intensity profile pattern which has the least deviation from the determined intensity profile, and determines the difference between the determined intensity profile and the stored intensity profile with the least deviation, and further including means for storing data specific to the secured document and the intensity profile pattern having the least deviation if such difference is less than or equal to a predetermined value.

20. A sensor for determining the authenticity of a secured document according to claim 15, wherein said means for verifying includes means for determining the slope of the intensity of the emitted radiation over said time period during which the intensity of the emitted radiation is increasing from said base level to said first maximum, and means for comparing the determined slope with at least one nominal slope value, the secured document being verified as authentic when the difference between said determined slope and said at least one nominal slope value is less than or equal to a specified value.

21. A sensor for determining the authenticity of a secured document according to claim 20, wherein said means for comparing compares the determined slope with a plurality of stored nominal slope values, and determines the stored nominal slope value which deviates the least from the determined slope, and means for determining the difference between the determined slope and the nominal slope value with the least deviation, and means for storing said data specific to the determined slope and the nominal slope with the least deviation, if such deviation is less than or equal to a specific value.

22. A sensor for determining the authenticity of a secured document according to claim 17, including means for assigning said specified difference to the nominal value with the least deviation from the measured time interval.

23. A sensor for determining the authenticity of a secured document according to claim 19, including means for assigning said predetermined value to the intensity profile pattern with the least deviation.

24. A sensor for determining the authenticity of a secured document according to claim 21, including means for assigning said specific value to the nominal slope value with the least deviation.

25. A sensor for determining the authenticity of a secured document according to claim 15, further including means for comparing the intensity ratio of two anti-Stokes emission lines with a nominal intensity ratio as an additional criterion for verifying authenticity.

26. A sensor for determining the authenticity of a secured document according to claim 15, including image recognition means for ascertaining at least one characteristic of said authenticity element prior to exciting the authenticity element with radiation.

27. A sensor for determining the authenticity of a secured document according to claim 26, wherein the security documents comprise postal documents and the authentication elements are contained on postage stamps and/or release stamps.

28. A sensor for determining the authenticity of a secured document according to claim 27, further including means for postmarking the postage stamp or the release stamp if the postal item has been identified as authentic.

29. A sensor according to claim 15, further including an object for providing a signal when scanning of the authenticity element starts and when it ends.

30. A sensor according to claim 15, wherein the means for exciting the authenticity element comprises a laser having an excitation wavelength above 900 nm.

31. A sensor according to claim 15, wherein a concave mirror is provided in the path of the beam emitted from the authenticity element, said concave mirror bundling the radiation to thereby equalize different heights of secured documents.

* * * * *